US012520983B2

(12) United States Patent
Wang

(10) Patent No.: US 12,520,983 B2
(45) Date of Patent: Jan. 13, 2026

(54) WATER-SAVING MOP BUCKET

(71) Applicant: Fujun Wang, Liaoyuan (CN)

(72) Inventor: Fujun Wang, Liaoyuan (CN)

( * ) Notice: Subject to any disclaimer, the term of this patent is extended or adjusted under 35 U.S.C. 154(b) by 378 days.

(21) Appl. No.: 18/121,021

(22) Filed: Mar. 14, 2023

(65) Prior Publication Data

US 2024/0306878 A1 Sep. 19, 2024

(51) Int. Cl.

*A47L 13/58* (2006.01)
*B08B 1/12* (2024.01)
*B08B 3/02* (2006.01)
*G05G 1/30* (2008.04)
*G05G 1/44* (2008.04)
*G05G 1/46* (2008.04)

(52) U.S. Cl.

CPC ................ *A47L 13/58* (2013.01); *B08B 1/12* (2024.01); *B08B 3/02* (2013.01); *G05G 1/305* (2013.01); *G05G 1/44* (2013.01); *G05G 1/46* (2013.01)

(58) Field of Classification Search

CPC ........ A47L 11/00; A47L 13/58; A47L 13/258; F26B 19/00
See application file for complete search history.

(56) References Cited

U.S. PATENT DOCUMENTS 8,327,502 B2 * 12/2012 Tsai ........................ A47L 13/58 15/260
8,347,451 B2 * 1/2013 Chen ........................ A47L 13/58 384/903
8,407,849 B2 * 4/2013 Chen ........................ A47L 13/58 15/260
9,867,518 B1 * 1/2018 Miramontes .......... A47L 13/255
2010/0242205 A1 * 9/2010 Chen ........................ A47L 13/58 15/263
2011/0000046 A1 * 1/2011 Chen ........................ A47L 13/58 15/260
2011/0049046 A1 * 3/2011 Yu ........................... A47L 13/58 210/512.3
2011/0225762 A1 * 9/2011 Tsai ........................ A47L 13/58 15/260
2018/0028040 A1 * 2/2018 Delangue .................. B08B 3/02
2022/0015600 A1 * 1/2022 Oliva ...................... F24H 1/185
2022/0125272 A1 * 4/2022 Vo ........................... A47L 13/58
2022/0211242 A1 * 7/2022 Metzel .................... A47L 13/58

FOREIGN PATENT DOCUMENTS

DE 102017006890 B3 * 9/2018 ............. A47L 13/24

* cited by examiner

*Primary Examiner* — Michael D Jennings
(74) *Attorney, Agent, or Firm* — Jose Cherson Weissbrot

(57) ABSTRACT

A water-saving mop bucket includes an outer bucket, an inner bucket, a cover plate assembly and a pedal mechanism. The cover plate assembly is detachably fit in the middle of the inner bucket. The pedal mechanism is installed at the lower part of the outer bucket and extends upward through the inner bucket, and is detachably connected with the cover plate assembly. The water spraying structure is arranged in the center, and the sprayed water can flow from the inside to the outside under the centrifugal force, so that the entire mop can be washed, and all the sprayed water can be effectively utilized, thus achieving water saving; meanwhile, the functions of cleaning and dehydration are realized.

10 Claims, 6 Drawing Sheets

WATER-SAVING MOP BUCKET

TECHNICAL FIELD

The present invention relates to the technical field of mop buckets, in particular to a water-saving mop bucket.

BACKGROUND

Mop is one of the important tools to clean the floor, and it is widely used. In the process of use, mop is usually used together with mop bucket, which is used to clean the mop to improve the mop's ability to clean the floor.

Most of the traditional mop buckets adopt the structure that dehydrated blue is installed on the mop bucket. For example, U.S. patent publication No. US20110247169A1 discloses a mop bucket, which includes a bucket body, a pivot, two fixing units and a basket. The bucket body is provided with a wall frame and a mounting sleeve, and the wall frame is formed in the side wall of the bucket body. The mounting sleeve is formed by a wall frame, and the pivot is rotatably installed through the mounting sleeve. The fixing units are respectively installed in the end openings of the mounting sleeve and are tightly installed around the pivot. The basket is firmly fixed on the pivot. Because the wall frame is formed on the side wall, the manufacturer can easily assemble the structure without overturning the bucket body, and the pivot is stabilized when rotating through the fixing device.

Although the mop bucket adopting this scheme can effectively spin dry the mop, its cleaning effect on the mop is limited. When cleaning, the mop is simply immersed in water, and the cleaning purpose is achieved by rotating the mop or pulling the mop up and down. Although this method can throw and peel off most dirty things from the mop, there are still many stains with small volume and strong adhesion that cannot be cleaned. In addition, the dirty things falling off the mop will directly enter the water body of the mop bucket. The water body becomes turbid, and repeated washing in the water body causes secondary pollution to the mop, which greatly reduces the mop's ability to clean the floor. In order to keep the mop clean, users can only constantly change the water in the mop bucket, resulting in great waste of water resources.

In order to clean the mop more cleanly and reduce the waste of water resources at the same time, the U.S. patent with the publication number of U.S. Ser. No. 11/096,547B1 discloses a water discharge control structure of a washing bucket capable of separating clean water from dirty water for washing a cleaning tool includes: a washing bucket body, wherein the washing bucket body is internally provided with a lifting frame fitted with the cleaning tool, and the lifting frame is driven by the cleaning tool to be lifted and lowered relative to the washing bucket body; the water discharge control structure includes a water storage tank which is connected to the washing bucket body and has a water outlet directing to the cleaning tool, a discharge of water of the water outlet is controlled by a plug, and when the lifting frame is in a high position, the lifting frame drives the plug to block the water outlet; and when the lifting frame is in a low position, the lifting frame drives the plug in a linked manner to open the water outlet, so that the water from the water outlet flows to the cleaning tool.

The mop bucket adopting this scheme adopts the design of cleaning and dirt separation, and is provided with bristles to clean the mop at the same time. Although the cleaning effect of the mop is good, the water nozzles of the mop are in the same direction as the bristles and are arranged in the direction far away from the rotating center of the mop, and the water on the mop flows to the periphery due to the centrifugal force, so that the water sprayed by several water nozzles at the periphery cannot be effectively utilized, and once sprayed, it is filtered into the sewage area, which also leads to the waste of water resources.

Based on the above contents, it is necessary to provide a mop bucket with good cleaning effect and reduced waste of water resources. The cleaning tool is arranged in the mop bucket, which can scrub the mop, and the purified water sprayed from the water nozzle can be used to the maximum extent to avoid waste of water resources.

SUMMARY

The present invention provides a water-saving mop bucket, which comprises an outer bucket, an inner bucket, a cover plate component and a pedal mechanism.

At least one embodiment of the present invention relates to a water-saving mop bucket, which includes an outer bucket, an inner bucket, a cover plate assembly and a pedal mechanism, wherein the inner bucket is installed at the upper part of the outer bucket, the cover plate assembly is detachably fit at the middle part of the inner bucket, and the pedal mechanism is installed at the lower part of the outer bucket, extends upward through the inner bucket and is detachably connected with the cover plate assembly;

the cover plate assembly includes a circular buckle cover, a rotating head, a cleaning brush block, a water storage ring cavity and a water outlet valve, wherein a central position of the circular buckle cover is provided with a circular through hole and a plurality of water outlet holes annularly distributed outside the circular through hole; the water storage ring cavity is installed at the bottom of the circular buckle cover and corresponds to positions of the circular through hole and the water outlet hole; the rotating head is inserted and installed in the circular through hole and extends downward to a lower part of the water storage ring cavity; the cleaning brush block is installed at an upper end of the circular buckle cover and located outside the water outlet hole; the water outlet valve is vertically installed at a side of the water storage ring cavity and communicated with the water outlet hole.

The pedal mechanism is connected with the rotating head to drive the rotating head to rotate; the water outlet valve is communicated with the inner bucket and controlled by the pedal mechanism to discharge water; when a rotating speed of the rotating head is faster and faster, the water outlet of the water outlet valve can be closed.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

In the figures.

1, Outer bucket; 101, Concave cavity; 102. Sewage outlet; 103, Sewage plug;

2. Inner bucket; 201, Water storage bucket; 202, Drain basket; 203, Impeller chamber; 204, Chamber cover; 205, Notch; 206, Water outlet pipe;

3, Cover plate assembly; 301, Circular buckle cover; 302, Rotating head; 303, Cleaning brush block; 304, Water storage ring cavity; 305 Water outlet valve; 305*a*, Water Outlet; 306. Circular through hole; 307, Water outlet hole;

4, Pedal mechanism; 401, Pedal; 402, Base; 403, Transmission rack; 404, Torsion spring; 405, Duplex gear; 406, Driven gear; 407, Transmission rod; 408, Impeller; 409, First connecting rod; 410, Second connecting rod; 411, First gear; 412, Second gear; 413, Third connecting rod;

5. Handle.

DESCRIPTION OF EMBODIMENTS

In the following, the technical scheme in the embodiment of the application will be clearly and completely described with reference to the drawings in the embodiment of the application. Obviously, the described embodiment is only a part of the embodiment of the application, but not the whole embodiment. Based on the embodiments in this application, all other embodiments obtained by those skilled in the art without creative labor belong to the protection scope of this application.

Reference to "example" or "embodiment" herein means that a particular feature, structure or characteristic described in connection with an embodiment or an embodiment can be included in at least one embodiment of this application. The appearance of this phrase in various places in the specification does not necessarily refer to the same embodiment, nor is it an independent or alternative embodiment mutually exclusive with other embodiments. It is understood explicitly and implicitly by those skilled in the art that the embodiments described herein can be combined with other embodiments.

In this specification, for the sake of convenience, words and expressions indicating orientation or positional relationship such as "middle", "upper", "lower", "front", "rear", "vertical", "horizontal", "top", "inner" and "outer" are used to illustrate the positional relationship of constituent elements with reference to the attached drawings, only for the convenience of description. The positional relationship of the constituent elements is appropriately changed according to the direction of the described constituent elements. Therefore, it is not limited to the words and expressions described in the specification, and can be replaced appropriately according to the situation.

Figure 1:
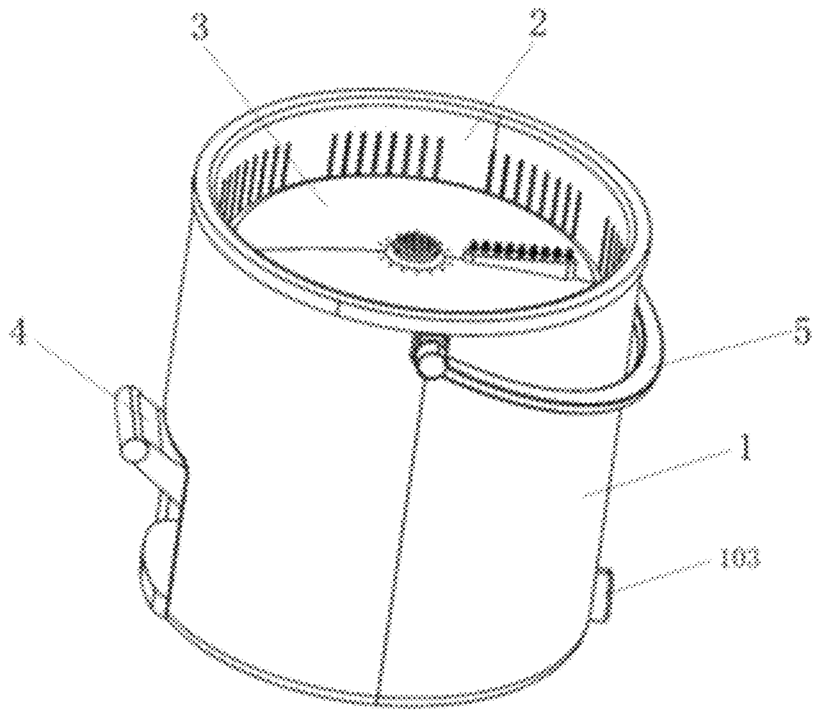
FIG. 1 is a schematic diagram of the three-dimensional structure of a water-saving mop bucket.
Figure 2:
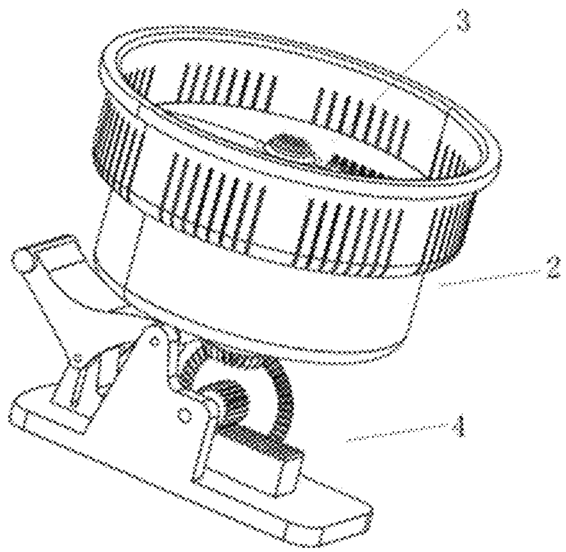
FIG. 2 is a schematic structural view without an outer bucket in FIG. 1.
Figure 3:
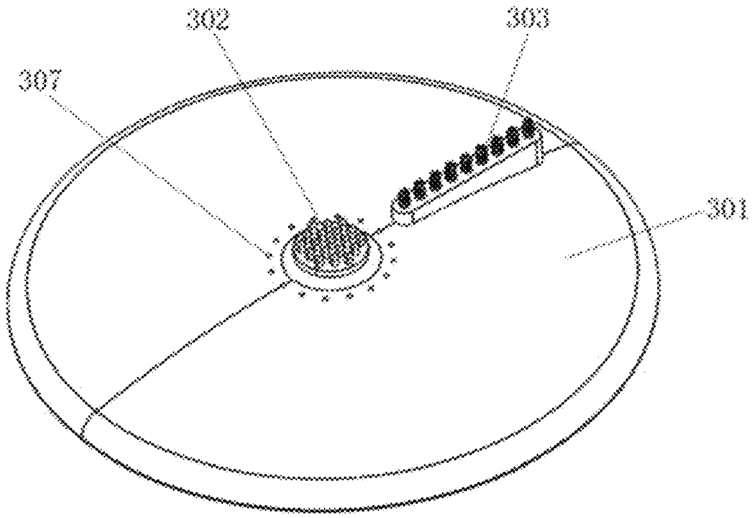
FIGS. 3 and 4 are schematic structural views of the cover plate assembly in FIG. 1.
Figure 4:
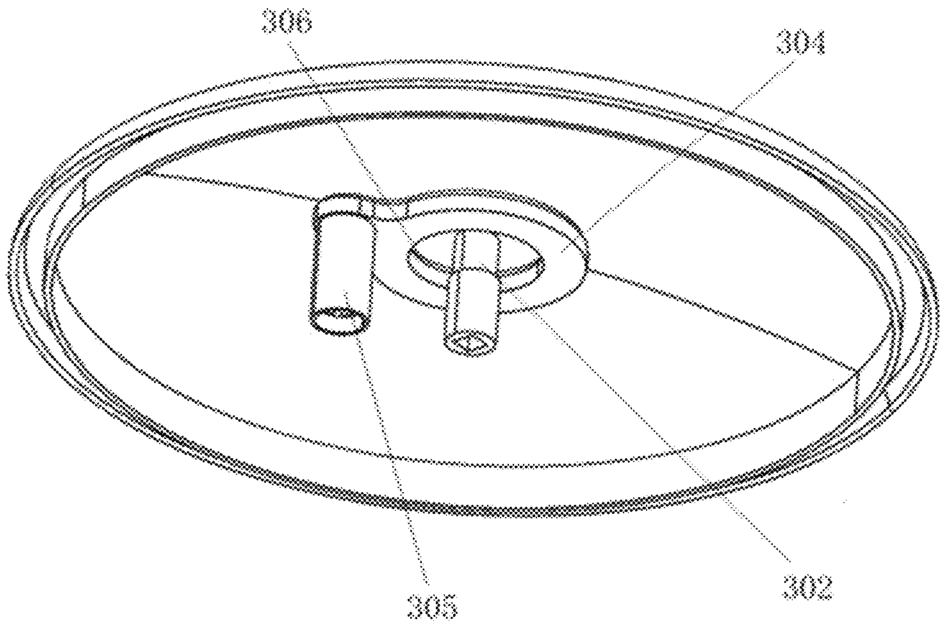
Figure 5:
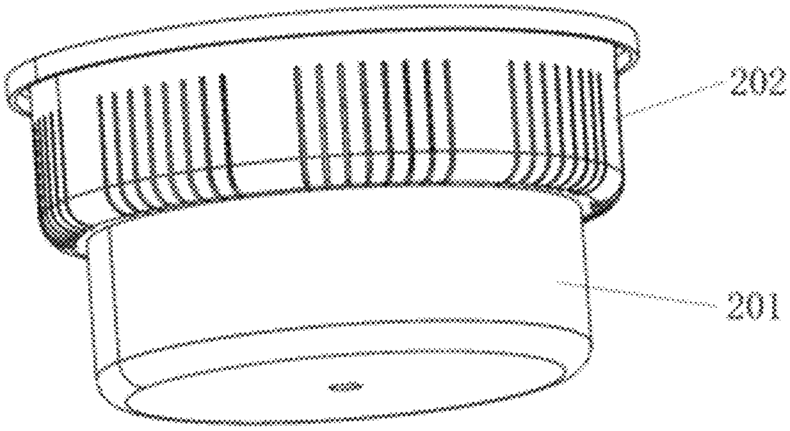
FIGS. 5 and 6 are schematic structural views of the inner bucket in FIG. 2.
Figure 6:
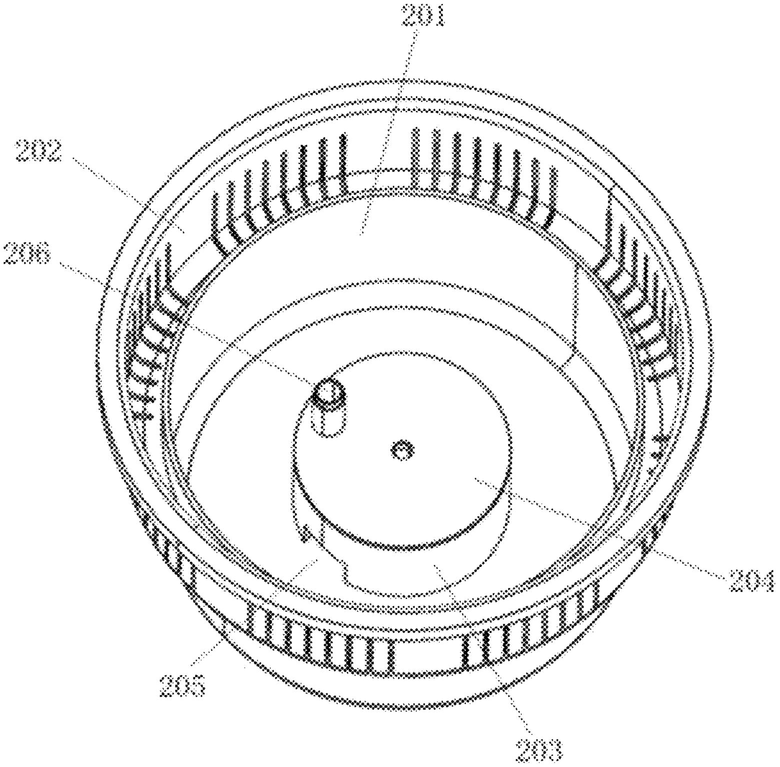
Figure 7:
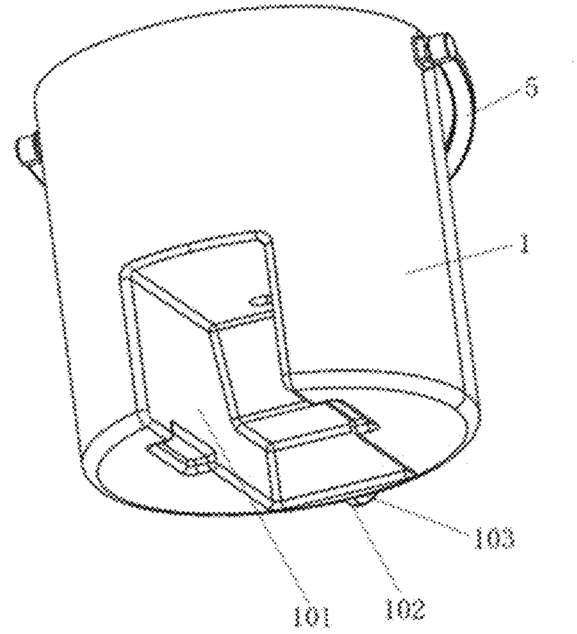
FIG. 7 is a schematic structural view of the outer bucket in FIG. 1.
Figure 8:
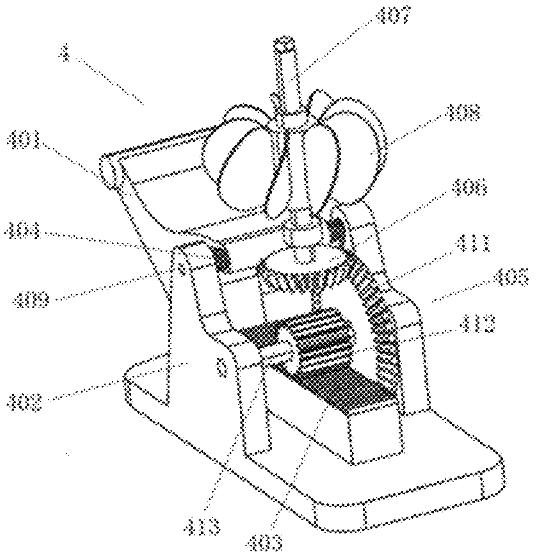
FIG. 8 is a schematic structural view of the pedal mechanism in FIG. 2.
Figure 9:
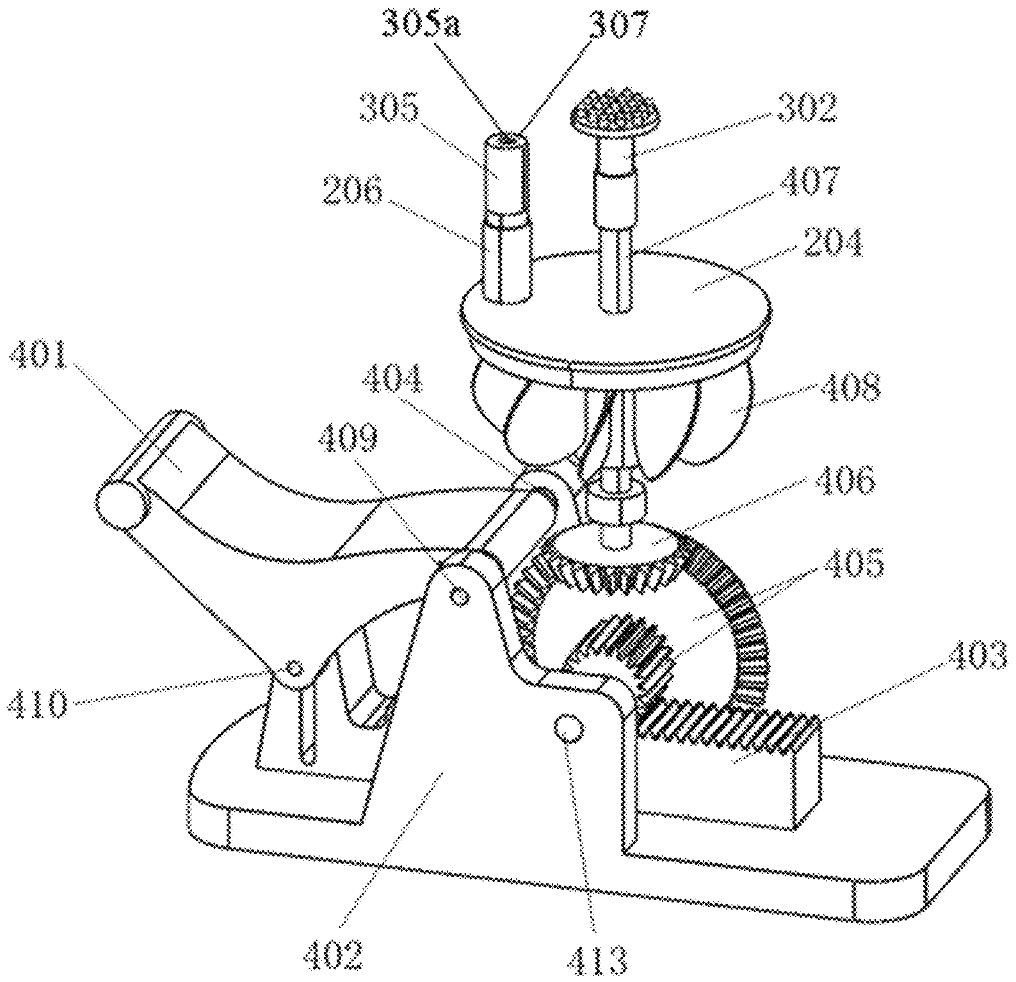
FIG. 9 is an assembly diagram of the pedal mechanism.

As shown in FIGS. 1 to 9, a water-saving mop bucket provided by the present invention includes an outer bucket 1, an inner bucket 2, a cover plate assembly 3 and a pedal mechanism 4.

The inner bucket 2 is installed at an upper part in the outer bucket 1, and the cover plate assembly 3 is detachably fit in the middle of the inner bucket 2.

The inner bucket 2 includes a water storage bucket 201, a drain basket 202, an impeller chamber 203 and a chamber cover 204; the drain basket 202 is installed at an upper end outside the water storage bucket 201 to form a boss structure; the cover plate assembly 3 is detachably fit at an opening of the upper end of the water storage bucket 201, and the impeller chamber 203 is installed in a central position in the water storage bucket 201; a notch 205 communicating with the water storage bucket 201 is formed in the impeller chamber 203; the chamber cover 204 covers an upper port of the impeller chamber 203, and an upper end surface of the impeller chamber is provided with a water outlet pipe 206 communicated with the water outlet valve 305.

The cover plate assembly 3 includes a circular buckle cover 301, a rotating head 302, a cleaning brush block 303, a water storage ring cavity 304 and a water outlet valve 305.

As a preferred embodiment of the present invention, the central position of the circular buckle cover 301 is provided with a circular through hole 306 and a plurality of water outlet holes 307 annularly distributed outside the circular through hole 306; the water storage ring cavity 304 is installed at the bottom of the circular buckle cover 301 and corresponds to positions of the circular through hole 306 and the water outlet hole 307; the rotating head 302 is inserted and installed in the circular through hole 306 and extends downward to a lower part of the water storage ring cavity 304; the cleaning brush block 303 is installed at an upper end of the circular buckle cover 301 and located outside the water outlet hole 307; the water outlet valve 305 is vertically installed at a side of the water storage ring cavity 304 and communicated with the water outlet hole 307.

In this embodiment, the water in the water outlet valve 305 is ejected from the water outlet hole 307 through the water storage ring cavity 304. When the mop is rotated and cleaned with the rotating head 302 as the rotating center, the sprayed water will flow to the periphery of the mop under the centrifugal force, and at this time, the water sprayed from the water outlet hole 307 will flow through the whole mop, thus maximizing the utilization of clean water, effectively avoiding the problem that the water sprayed from the water spray nozzle arranged at the periphery is not effectively utilized in the prior art, and greatly saving water resources.

In some embodiments, the number of the water outlet holes 307 can be single or multiple, and it is only necessary to set the end edge of the circular through hole 306 so that the purified water sprayed from the water outlet holes 307 faces the center of the mop.

In order to increase the mop cleaning effect of the mop bucket, a cleaning brush block 303 is arranged at the upper end of the circular buckle cover 301 and is located outside the water outlet hole 307. By cleaning the brush block 303, impurities on the mop, such as hair and other substances, can be cleaned to prevent them from sticking to the mop, further achieving the cleaning effect.

In some embodiments, the cleaning brush block 303 is arranged outside the water outlet hole 307 and has an arbitrary geometric shape. In other embodiments, there may be a plurality of cleaning brush blocks 303, which are distributed around the outside of the water outlet hole 307. In other embodiments, the cleaning brush block 303 can also be configured to be replaceable to increase the service life of the mop bucket.

In order to make the mop bucket have the function of throwing water, a valve ball (not shown in the figure) is arranged inside the water outlet valve 305. When the rotating speed of the rotating head 302 is accelerated, the pressure in the impeller chamber 203 is also increased. When the pressure exceeds the threshold, the valve ball will block the water outlet 305*a* of the water outlet valve 305, and the water outlet hole 307 will no longer spray water. At this time, because the rotating head 302 continues to drive the mop to rotate, the mop will be thrown dry in high-speed rotation, so that the mop bucket will be dried at the same time.

When in use, the cover plate assembly 3 covered on the water storage bucket 201 is removed, water is added into the water storage bucket 201, and then the cover plate assembly 3 is covered and closed again. The impeller chamber 203 is used to install the impeller, and the water in the water storage tank 201 will also flow into the impeller chamber 203, and the water in the impeller chamber 203 will be supplied to the water valve 305 through the water outlet pipe 207 through the rotation of the impeller. During cleaning, the generated sewage flows into the outer tub 1 through the upper drain basket 202 to isolate the dirty water without affecting the water used during cleaning.

In order to make the use of the mop bucket more labor-saving and convenient for users, the water-saving mop bucket provided by the present invention adopts a pedal driving mode.

As shown in the figure, the pedal mechanism 4 is installed at the lower part of the outer bucket 1 and extends upward through the inner bucket 2 to be detachably connected with the cover plate assembly 3.

The pedal mechanism 4 is connected with the rotating head 302 to drive the rotating head 302 to rotate, and the water outlet valve 305 is connected with the inner bucket 2, and the water outlet valve 305 is controlled by the pedal mechanism 4 to discharge water. When the rotating speed of the rotating head 302 is faster and faster, the water outlet of the water outlet valve 305 can be closed.

The outer bucket 1 has a cylindrical structure, the bottom of which is provided with a concave cavity 101 for accommodating the pedal mechanism 4, and a sewage outlet 102. A sewage plug 103 is installed in the sewage outlet 102. After use, the sewage in the outer bucket 1 can be discharged through the sewage outlet 102 by opening the sewage plug 103.

Specifically, the pedal mechanism 4 includes a pedal 401, a base 402, a transmission rack 403, torsion springs 404, a duplex gear 405, a driven gear 406, a transmission rod 407 and an impeller 408; the transmission rack 403 is movably installed at a middle position of an upper end of the base 402; a rear end of the pedal 401 is installed at the upper end of the base 402 by a first connecting rod 409, and a bottom of the pedal 401 is installed at a front end of the transmission rack 403 by a second connecting rod 410; the torsion springs 404 are symmetrically installed at both ends of the first connecting rod 409 and are located inside the base 402; the transmission rod 407 is vertically arranged, an upper end thereof passes through the bottom of the inner bucket 2 and the chamber cover 204, and then extends upward to connect with a bottom of the rotating head 302 of the cover plate assembly 3, and a lower end thereof is connected with the driven gear 406; the duplex gear 405 comprises a first gear 411 and a second gear 412; the first gear 411 of the duplex gear 405 is engaged with the transmission rack 403, and the second gear 412 of the duplex gear 405 is engaged with the driven gear 406; the impeller 408 is sleeved on the transmission rod 407 and located in the impeller chamber 203 of the inner bucket 2.

The duplex gear 405 includes a first gear 411 and a second gear 412; the first gear 411 of the duplex gear 405 is engaged with the transmission rack 403, and the second gear 412 of the duplex gear 405 is engaged with the driven gear 406. The first gear 411 and the second gear 412 of the duplex gear 405 are both connected with the base 402 by a third connecting rod 413; and the first gear 411 is located at the side of the transmission rack 403, while the second gear 412 is located above the transmission rack 403. The driven gear 406 and the first gear 411 adopt corresponding bevel gears for facilitating engagement, and the transmission rack 403 and the second gear 412 adopt corresponding spur gears for facilitating engagement.

The upper end surface of the pedal 401 is an arc pedal surface to provide a comfortable operation mode, which is convenient for the foot to step on the pedal 401. The lower end face of the pedal 401 is triangular, the rear end of the pedal 401 is connected with the base 402 through the first connecting rod 409, and the lower end of the middle part is connected with the front end of the transmission rack 403. When the pedal 401 is stepped on by the foot, the transmission rack 403 can move back and forth in the base 402.

When stepping on the pedal 401 up and down and back and forth, the pedal 401 first pushes the transmission rack 403 to move backward in the base 402 through the second connecting rod 410, and then the pedal 401 pulls the transmission rack 403 to move forward in the base 402 through the first connecting rod 409 and the torsion spring 404, so that the transmission rack 403 can move back and forth in the base 402. The restoring force of the transmission rack 403 is provided by the torsion spring 404, which is convenient to use.

When the transmission rack 403 moves back and forth, the driven gear 406 and the driving rod 407 are driven to rotate back and forth through the duplex gear 405, so that the impeller 408 and the rotating head 302 are driven to rotate through the rotation of the driving rod 407.

The transmission rack 403 which can move back and forth is driven by the pedal 401. By using the mechanical transmission effect of the transmission rack 403, the duplex transmission gear 405 and the driven gear 406, the sliding movement of the transmission rack 403 is converted into the rotary movement of the impeller 408 and the rotating head 302, so that the water in the impeller chamber 203 is conveyed upwards by the rotation of the impeller 408 and sprayed from the water outlet 307 through the water outlet valve 305, and the mop is cleaned by the rotation of the rotating head 302. Because the pedal is used as the power source, it replaces the traditional manual extrusion operation mode, relatively speaking, it can achieve the functions of cleaning and dehydration at the same time, and it is more simple and convenient to operate, saving time and labor, which brings many conveniences to people's dehydration. In addition, because it adopts the transmission mechanism of transmission rack 403, duplex gear 405 and driven gear 406, practice has proved that this transmission mechanism has stable running performance, durability and extremely long service life in the actual use process.

In this embodiment, the water-saving mop bucket further includes a handle 5, and the handle 5 is rotatably connected to the upper part of the outer wall of the outer bucket 1 for convenient taking.

When in use, the user first takes off the cover plate assembly 3 fit in the water storage bucket 201, adds water into the water storage bucket 201, then fit the cover plate assembly 3 again, places the mop head to be dehydrated in the drain basket 202 of the inner bucket 2 and above the cover plate assembly 3, and then drives the pedal mechanism 4 by stepping on the pedal 401, which drives the rotating head 302 on the cover plate assembly 3 to rotate, and controls the water outlet hole 307 to spray water. The water spraying structure is located in the center, and the sprayed water flows from the inside to the outside under the centrifugal force, so that the mop can be completely washed and cleaned, and all the sprayed water is effectively utilized. After cleaning for a period of time, the rotating speed of the rotating head 302 becomes faster and faster, and the water outlet hole 307 does not spray water any more. When the rotating head 302 rotates back and forth at a high speed, the water placed in the mop is thrown out and flows into the outer bucket 1 from the drainage through groove on the wall of the drain basket 202, thus simultaneously realizing the functions of pedal rotary cleaning and dehydration.

The technical means disclosed in the scheme of the present invention are not limited to the technical means disclosed in the above embodiments, but also include the technical scheme composed of any combination of the above technical features. It should be pointed out that for those skilled in the art, several improvements and embellishments can be made without departing from the principle of the invention, and these improvements and embellishments are also regarded as falling within the protection scope of the invention.

What is claimed:

1. A water-saving mop bucket, comprising an outer bucket, an inner bucket, a cover plate assembly and a pedal mechanism, wherein the inner bucket is installed at an upper part in the outer bucket, and the cover plate assembly is detachably fit in the middle of the inner bucket; the pedal mechanism is installed at a lower part of the outer bucket and extends upward through the inner bucket, and is detachably connected with the cover plate assembly;

the cover plate assembly comprises a circular buckle cover, a rotating head, a cleaning brush block, a water storage ring cavity and a water outlet valve, wherein a central position of the circular buckle cover is provided with a circular through hole and a plurality of water outlet holes annularly distributed outside the circular through hole; the water storage ring cavity is installed at the bottom of the circular buckle cover and corresponds to positions of the circular through hole and the plurality of water outlet holes; the rotating head is inserted and installed in the circular through hole and extends downward to a lower part of the water storage ring cavity; the cleaning brush block is installed at an upper end of the circular buckle cover and located outside the plurality of water outlet holes; the water outlet valve is vertically installed at a side of the water storage ring cavity and communicated with the plurality of water outlet holes; the pedal mechanism is connected with the rotating head to drive the rotating head to rotate; the water outlet valve is communicated with the inner bucket and controlled by the pedal mechanism to discharge water; when a rotating speed of the rotating head is faster and faster, a water outlet of the water outlet valve can be closed.

2. The water-saving mop bucket according to claim 1, wherein the inner bucket comprises a water storage bucket, a drain basket, an impeller chamber and a chamber cover; the drain basket is installed at an upper end outside the water storage bucket to form a boss structure; the cover plate assembly is detachably fit at an opening of the upper end of the water storage bucket, and the impeller chamber is installed in a central position in the water storage bucket; a notch communicating with the water storage bucket is formed in the impeller chamber; the chamber cover covers an upper port of the impeller chamber, and an upper end surface of the impeller chamber is provided with a water outlet pipe communicated with the water outlet valve.

3. The water-saving mop bucket according to claim 1, wherein the outer bucket has a cylindrical structure, and the bottom thereof is provided with a cavity for accommodating the pedal mechanism.

4. The water-saving mop bucket according to claim 3, wherein the pedal mechanism comprises a pedal, a base, a transmission rack, torsion springs, a duplex gear, a driven gear, a transmission rod and an impeller; the transmission rack is movably installed at a middle position of an upper end of the base; a rear end of the pedal is installed at the upper end of the base by a first connecting rod, and a bottom of the pedal is installed at a front end of the transmission rack by a second connecting rod; the torsion springs are symmetrically installed at both ends of the first connecting rod and are located inside the base; the transmission rod is vertically arranged, an upper end thereof passes through the bottom of the inner bucket and the chamber cover, and then extends upward to connect with a bottom of the rotating head of the cover plate assembly, and a lower end thereof is connected with the driven gear; the duplex gear comprises a first gear and a second gear; the first gear of the duplex gear is engaged with the transmission rack, and the second gear of the duplex gear is engaged with the driven gear; the impeller is sleeved on the transmission rod and located in the impeller chamber of the inner bucket.

5. The water-saving mop bucket according to claim 4, wherein the first gear and the second gear of the duplex gear are both connected with the base by a third connecting rod; and the first gear is located at the side of the transmission rack, while the second gear is located above the transmission rack.

6. The water-saving mop bucket according to claim 5, wherein the driven gear and the first gear adopt corresponding bevel gears, and the transmission rack and the second gear adopt corresponding spur gears.

7. The water-saving mop bucket according to claim 6, wherein when a foot steps on the pedal, the pedal pushes the transmission rack to move forward in the base through the second connecting rod; when the foot leaves the pedal, the pedal pulls the transmission rack to move backward in the base through the first connecting rod and the torsion springs, so that the transmission rack moves back and forth in the base.

8. The water-saving mop bucket according to claim 7, wherein when the transmission rack moves back and forth, the driven gear and the transmission rod are driven to rotate back and forth by the duplex gear to drive the impeller and the impeller to rotate through the rotation of the transmission rod.

9. The water-saving mop bucket according to claim 1, wherein the outer bucket is further provided with a sewage outlet, and a sewage plug is installed in the sewage outlet.

10. The water-saving mop bucket according to claim 1, wherein the water-saving mop bucket further comprises a handle, and the handle is rotatably connected to an upper part of an outer wall of the outer bucket.

* * * * *